Patented Nov. 17, 1942

2,302,581

UNITED STATES PATENT OFFICE 2,302,581

FERTILIZER

Walter Schoeller, Berlin-Charlottenburg, and Hans Goebel, Berlin-Reinickendorf, Germany, assignors to Schering Corporation, Bloomfield, N. J., a corporation of New Jersey No Drawing. Application October 25, 1939, Serial No. 301,161. In Germany October 5, 1938

20 Claims. (Cl. 71—2)

This invention relates to fertilizers and has for its object to provide a new kind of fertilizers and/or agents for stimulating and furthering growth and development of plants.

It is already known from U. S. Patent No. 1,968,176 to use germinal gland hormones, obtained from animal or vegetable starting materials or by synthesis, as fertilizers or stimulating agents for plants especially for their generative development.

Now we have found that also other compounds possessing oestrogenic activity, but having a chemical constitution different from that of the known oestrogenic germinal gland hormones, may be used in an advantageous manner as fertilizers or stimulating agents for plants. Especially suitable for this purpose are, for instance, the di-p-hydroxyphenyl)-dialkyl ethenes and ethanes and their derivatives, obtainable for example according to Dodds et al (compare Nature 141, page 247 (1938)).

We found that compounds like di-ethyl-stilboestrol (di-p-hydroxyphenyl)-diethyl ethene) per se or in combination with auxines, for instance, heteroauxine or with other compounds capable of stimulating plant growth, for instance, vitamines are capable of influencing the growth and development of plants in an extraordinarily favourable manner. These compounds may also be used in mixture with artificial fertilizer salts such as ammonium nitrate, ammonium sulfate, urea and its salts, phosphates like ammoniumphosphate or superphosphate and the like. Finally they may be used in mixture with lime, peat, lignite or the like.

The following comparative experiments illustrate the invention without, however, limiting the same to them.

Asters are used as experimental plants. Young aster plants are planted each in one pot and the pots are placed in the ground. After the plants are grown up and after eliminating inferior plants an experiment is carried out with 3 series of 45 plants each.

Series 1 was watered once weekly for 3 weeks with a solution of 0.1 mg. of di-ethyl-stilboestrole, dissolved in 10 ccs. of water, containing 0.03 cc. of n/10 sodium hydroxide solution, with a 0.2% solution of fertilizer salts.

Series 2 was watered with a mixture of di-ethyl-stilboestrole and heteroauxine, dissolved as in series 1, with a 0.2% solution of fertilizer salts.

Series 3 serving as control was treated only with the 0.2% solution of fertilizer salts together with the amount of water, used in the first two series for watering.

Within 16 days the development of the plants was as follows:

Series 1:
    6 plants dead=13.3%
    39 plants living
    146 open flowers
    81 buds Series 2:
    9 plants dead=20%
    37 plants living
    137 open flowers
    55 buds
    Flowers and buds together 192

Series 3 (control):
    12 plants dead=26.6%
    33 plants living
    102 open flowers
    35 buds
    Flowers and buds together 137.

In the following figures these are compared with each other:

*Excess of flowers and buds over control experiment*

| | Flowers | Buds | Flowers and buds |
|---|---|---|---|
| Series 1: | +21% | +98% | +41% |
| Series 2: | +23% | +46% | +29% |

These experiments show that the number of flowers and buds is considerably increased by treatment with the agents described herein.

Regarding the number of dead plants it is evident that the plants treated according to this invention possess a much higher resistance to noxious influences than the controls. In Series 1 only 13.3% of the plants died, in Series 3 26.6%. Thus the resistance of the plants treated in Series 1 is 100% higher than that of the plants untreated.

Furthermore the weight of the plants on harvesting is increased by the treatment described; for the weight of the fresh plants after harvesting was in Series 1: 660 gr.; Series 2: 480 gr.; Series 3 (control): 400 gr.

Instead of diethylstilboestrol other dialkyl-stilboestrols may likewise be used, such as dimethyl-, dipropylstilboestrol and the like, furthermore dihydrostilboestrols such as dimethyl-, diethyl-, dipropyldihydrostilboestrol and the like, stilboestrols substituted by unsaturated alkyl groups, stilboestrols wherein one or both benzene nuclei are partly or completely hydrogenated and the derivatives of all these compounds, such as the esters, ethers, glucosides and so forth.

Of course, various changes may be made in the details disclosed in the foregoing specification without departing from the invention and the claims annexed hereto.

What we claim is:

1. A composition prepared in a form for administration to plants for promoting growth thereof, comprising a compound of the formula

wherein R and R' are members of the group consisting of the hydroxyl group and groups convertible thereinto with the aid of hydrolysis, X and X' are members of the class consisting of phenyl and hydrogenated phenyl radicals, R and R' being in the p-position, and Y is an aliphatic group including a two-carbon chain connecting X and X', said two carbons being each substituted by an aliphatic hydrocarbon radical.

2. A fertilizer and stimulating agent for plant growth comprising a dialkyl-stilboestrol compound mixed with a fertilizer salt.

3. A fertilizer and stimulating agent for plant growth comprising a mixture of a dialkyl-stilboestrol and a smaller quantity of an alkali metal hydroxide.

4. A fertilizer and stimulating agent for plant growth comprising a diethyl-stilboestrol mixed with a fertilizer salt.

5. A fertilizer and stimulating agent for plant growth comprising a dialkyl-stilboestrol compound and an auxine compound.

6. A fertilizer and stimulating agent for plant growth comprising a dialkyl-stilboestrol compound and heteroauxine.

7. A fertilizer and stimulating agent for plant growth comprising a dialkyl-stilboestrol derivative and an auxine.

8. A fertilizer and stimulating agent for plant growth comprising a dialkyl-stilboestrol derivative and heteroauxine.

9. A fertilizer and stimulating agent for plant growth comprising di-ethyl-stilboestrol and an auxine.

10. A fertilizer and stimulating agent for plant growth comprising di-ethyl-stilboestrol and heteroauxine.

11. A fertilizer and stimulating agent for plant growth, comprising a compound of the formula

wherein R and R' are members of the group consisting of the hydroxyl group and groups convertible thereinto with the aid of hydrolysis, X and X' are members of the class consisting of phenyl and hydrogenated phenyl radicals, R and R' being in the p-position, and Y is an aliphatic group including a two-carbon chain connecting X and X', said two carbons being each substituted by an aliphatic hydrocarbon radical, and a fertilizer salt.

12. A fertilizer and stimulating agent for plant growth, comprising a compound of the formula

wherein R and R' are members of the group consisting of the hydroxyl group and groups convertible thereinto with the aid of hydrolysis, X and X' are members of the class consisting of phenyl and hydrogenated phenyl radicals, R and R' being in the p-position and Y is an aliphatic group including a two-carbon chain connecting X and X', said two carbons being each substituted by an aliphatic hydrocarbon radical, an auxine compound and a fertilizer salt.

13. A fertilizer and stimulating agent for plant growth comprising diethylstilboestrol and a fertilizer.

14. A fertilizer and stimulating agent for plant growth comprising diethylstilboestrol, heteroauxine, and a fertilizer.

15. A fertilizer and stimulating agent for plant growth comprising a dialkylstilboestrol compound and a fertilizer.

16. A fertilizer and stimulating agent for plant growth comprising a dialkylstilboestrol compound, an auxine compound, and a fertilizer.

17. The method of stimulating plant growth comprising adding to the stratum in which the plants are rooted an oestrogenic compound of the group consisting of substituted and unsubstituted and hydrogenated and unhydrogenated di-(p-hydroxyphenyl)-dialkyl-ethenes and ethanes.

18. The method of stimulating plant growth comprising adding to the stratum in which the plants are rooted a dialkylstilboestrol compound.

19. The method of stimulating plant growth comprising adding to the stratum in which the plants are rooted diethylstilboestrol.

20. The method of stimulating plant growth comprising adding to the stratum in which the plants are rooted a dialkylstilboestrol compound and an auxine compound.

WALTER SCHOELLER.
HANS GOEBEL.